(12) United States Patent
Sato (10) Patent No.: US 6,421,496 B1
(45) Date of Patent: Jul. 16, 2002

(54) CAMCORDER SIGNAL PROCESSOR HAVING SUPERIMPOSITION CAPABILITY AND DUAL PLL

(75) Inventor: Yasushi Sato, Kanagawa (JP)

(73) Assignee: Sony Corporation (JO)

( * ) Notice: Subject to any disclaimer, the term of this patent is extended or adjusted under 35 U.S.C. 154(b) by 0 days.

(21) Appl. No.: 09/067,033

(22) Filed: Apr. 28, 1998

(30) Foreign Application Priority Data

Apr. 30, 1997 (JP) .............................................. 9-113249

(51) Int. Cl.[7] .......................... H04N 9/00; H04N 11/00; H04N 5/225; H04N 9/04; H04N 5/76
(52) U.S. Cl. ............................... 386/1; 386/38; 348/207
(58) Field of Search ............................... 358/906, 909.1; 386/1, 38, 117; 348/234, 222, 312, 207

(56) References Cited

U.S. PATENT DOCUMENTS 5,552,826 A  *  9/1996  Hieda et al. ................ 348/222

5,949,957 A  *  9/1999  Yamada et al. ............. 386/117

* cited by examiner

*Primary Examiner*—Andrew B. Christensen
*Assistant Examiner*—Po-lin Chieu
(74) *Attorney, Agent, or Firm*—Ronald P. Kananen; Rader, Fishman & Grauer PLLC (57) ABSTRACT

A master clock MCK is generated by a first PLL circuit constituted with a VCO, which is outputted, as an operation clock, to an on-screen display and a CCD driving timing generation circuit when an image signal is supplied from a CCD, a standard clock 4Fsc is outputted, as an operation clock, to the signal processing circuit, and a clock synchronized with the VTR reproduced video signal is generated by a first PLL circuit and outputted, as an operation clock, to an on-screen device when a VTR reproduced image signal is inputted, and a second standard clock synchronized with the line input signal is generated by a PLL circuit and outputted as an operation clock, and the clock synchronized with the line input signal is generated by the first PLL circuit and may be when line input signal is inputted outputted as an operation clock to the on-screen display, whereby the constitution of the signal processing circuit to be applied to the camcorder.

9 Claims, 4 Drawing Sheets

CAMCORDER SIGNAL PROCESSOR HAVING SUPERIMPOSITION CAPABILITY AND DUAL PLL

BACKGROUND OF THE INVENTION

1. Field of the Invention

The present invention concerns a signal processing circuit suitable to use for a camcorder.

2. Description of Related Art

In recent years, a camcorder capable of recording image signals picked-up by a image pick-up device or external input signals supplied from an external input terminal by a video tape recorder (VTR) or playing back video signals recorded by VTR has been popularized.

Figure 4:
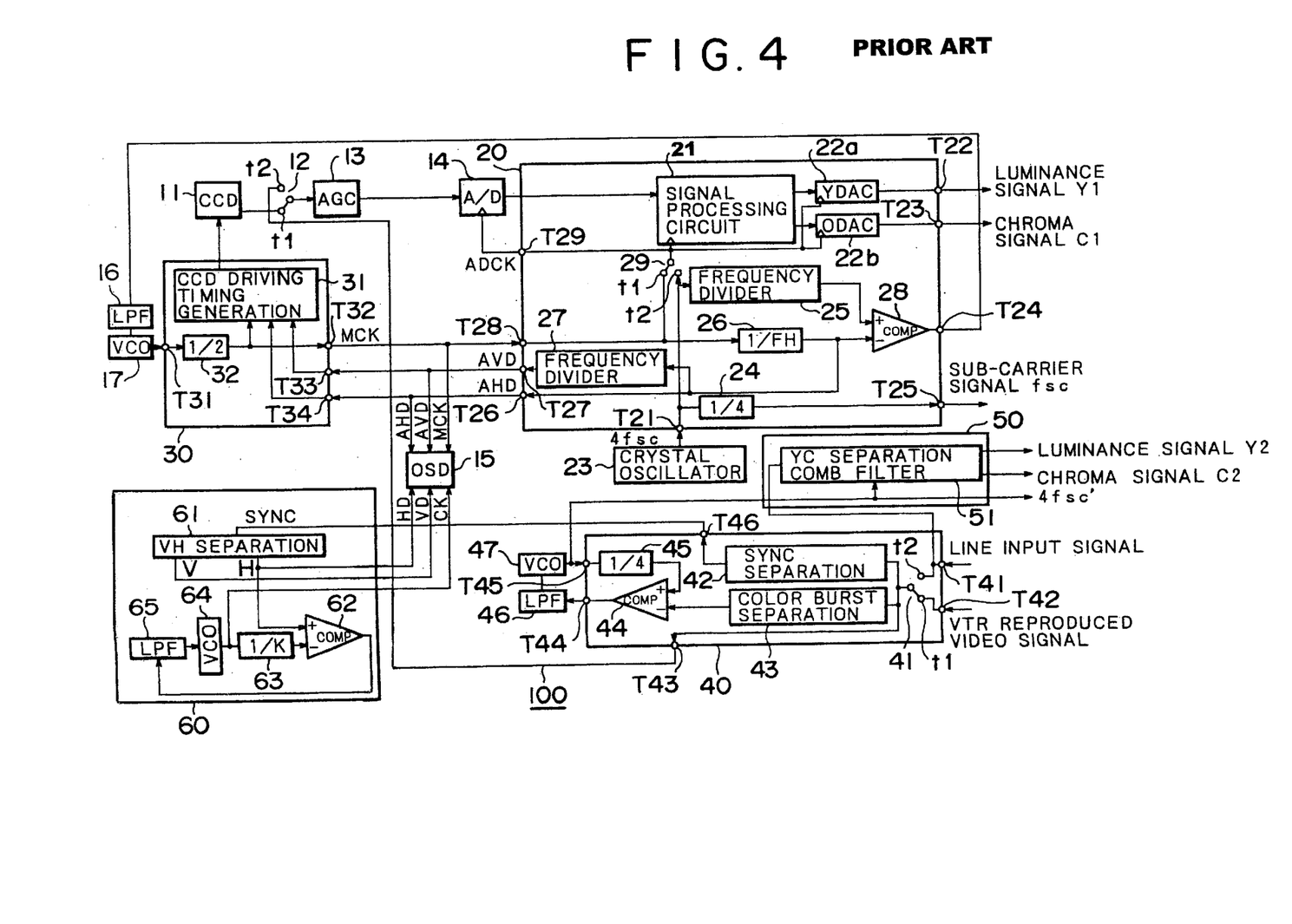
FIG. 4 is a block diagram for a signal processing circuit of the prior art.

FIG. 4 shows an example of a block diagram for an existent signal processing circuit applied to the camcorder described above. A signal processing circuit shown in FIG. 4 comprises, as main blocks, a CCD 11 (Charge Coupled Device) solid state image pick-up device (hereinafter referred to simply as "CCD"), an auto gain control circuit 13 (hereinafter referred to as "AGC circuit"), an A/D converter 14, an on-screen display (OSD) 15, a camera signal processing block 20, a timing generation block 30, a burst lock block 40, a line input comb filter block 50, an external inputting phase locked loop (hereinafter referred to as "PLL") circuit block 60 and the like.

The CCD 11 is adapted to optoelectronically convert an image coupled by way of a not-illustrated optical lens to an image pick-up device and output the same as image signal.

The AGC circuit 13 is adapted to conduct gain control for the image signal supplied from the CCD 11 to a switch 12 upon camera photographing or a VTR reproduced video signal supplied by way of the switch 12 upon VTR playing back.

The A/D converter 14 is adapted to convert analog image/video signals gain controlled in the AGC circuit 13. into digital image/video signals.

The on-screen display 15 serves as display control section for display of character information or the like on a monitor such as a view finder.

The camera video signal processing block 20 is constituted, for example, with an LSI (Large Scale Integration) in which a signal processing circuit 21, D/A converters 22a, 22b are disposed as a signal processing circuit system, and frequency dividers 24–27, a phase comparator 28 and a switch 29 are disposed as a clock processing circuit system.

The signal processing circuit 21 comprises various kinds of circuits for applying predetermined processing when the image signal is supplied from the CCD 11 and a YC separation comb filter for removing cross talks and noises when the reproduced video signal is supplied from the VTR (hereinafter referred to as "reproduced type filter").

The D/A converter 22a converts a digital luminance signal (Y signal) outputted from the signal processing circuit 21 into a analog luminance signal, while the A/D converter a 22b converts digital color (chroma) signal (C signal) outputted from the signal processing circuit 21 into an analog chromatic signal.

The timing generation block 30 controls driving timing of the CCD 11 in which a CCD driving timing generation circuit 31 and a frequency divider 32 are provided. The timing generation block 30 is also constituted with an LSI.

The burst block 40 forms a signal in synchronization with a burst signal contained in a line input signal inputted from a line input terminal T41, in which are provided a switch 41 a sync separation circuit 42, a color aburst separation circuit 43, a phase comparator 44 and a frequency divider 45. The burst lock block 40 is also constituted with an LSI.

The line input comb filter block 50 conducts YC separation processing for a line input signal inputted from the line input terminal T41, in which a YC separation comb filter (hereinafter referred to as "line comb filter") 51 for conducting YC separation of the line input signal. The line input comb filter block 50 is also constituted with an LSI or the like.

The external input PLL circuit block 60 forms and supplies a clock CK, a horizontal sync signal HD and a vertical sync signal VD in synchronization with the external input signal to the on-screen display 15 when the external input signal such as the line input signal or the VTR reproduced video signal, in which a horizontal/vertical sync separation circuit 61, a phase comparator 62, a frequency divider 63, a voltage controlled oscillator (VCO) 64 and a low pass filter (LPF) 65 are provided.

The operation of the signal processing circuit 100 described above will be explained.

At first, explanation is to be made for the operation during camera recording for recording the image signal picked-up by the CCD 11 in the VTR.

Upon camera recording, the switch 12 and the switch 29 of the camera signal processing block 20 are controlled so as to be in contact with contacts t1 as shown in FIG. 4. In this case, the image signal picked-up by the CCD 11 is supplied by way of the switch 12, the AGC circuit 13, and the A/D converter 14 to the signal processing circuit 21 of the camera signal processing block 20 and applied with a predetermined processing by the signal processing circuit 21. Then, they are put to D/A conversion by the D/A converters 22a, 22b and outputted as a luminance signal Y1 and a chromatic signal C1 from terminals T22, T23 respectively and are supplied, for example, to a display circuit block or a VTR signal processing block in the succeeding stage not illustrated.

As the clock forming processing during camera recording, a clock 4Fsc four times as high as a sub-carrier signal Fsc (14.3 MHz where the television system is NTSC system, or at 17.3 MHz when the television system is PAL system), and the clock 4Fsc is used as a standard clock for operating the camcorder.

The standard clock 4Fsc is supplied to the frequency divider 24 and the frequency divider 25.

The frequency divider 24 divides the standard clock 4Fsc into 1/4, which is supplied from a terminal T25 as a sub-carrier signal Fsc. The sub-carrier signal Fsc is supplied to a not-illustrated VTR signal processing block as a modifying signal upon recording the image picked-up by the CCD 11 in VTR.

The frequency divider 25 divides the standard clock 4Fsc by a predetermined dividing ratio (for example 1/910 in a case of NTSC system and 1/1135 in a case of PAL system) and outputs the same, for example, as a horizontal sync signal to one terminal (+) of a phase comparator 28.

An output from the frequency divider 26 is supplied to the other terminal (−) of the phase comparator 28, and the phase comparator 28 outputs a result of phase comparison between the output from the frequency divider 25 and the output from the frequency divider 26.

The output from the phase comparator 28 is inputted by way of a terminal T24 to the low pass filter (LPF) 16 and supplied by way of the LPF 16 to the voltage control oscillator (VCO) 17. Therefore, the VCO 17 is controlled for the oscillation frequency by the output of the phase comparator 28. The output from the VCO 17 is supplied by. way of a terminal T31 to the frequency divider 32 of the timing generation block 30. The frequency divider 32 divides the output from the VCO 17 into 1/2, and the divided output is supplied as a master clock MCK from a terminal T32 by way of a terminal T28 of the camera signal processing block 20 to the frequency divider 26. The frequency divider 26 divides the master clock MCK by a divisional ratio 1/FH and outputs the same to the other terminal (−) of the phase comparator 28. The dividing ratio 1/FH of the frequency divider 26 is determined by the number of pixels of the CCD 11.

They constitute a PLL circuit for controlling the oscillation frequency of the VCO 17, and in a state in which the PLL circuit is locked, the master clock MCK is synchronized with the standard clock 4Fsc outputted from the crystal oscillator 23.

The master clock MCK is supplied to the CCD driving timing generation circuit 31 of the timing generation block 30, the on-screen display 15 and by way of the switch 29 of the camera signal processing block 20 to the signal processing circuit 21 and the D/A converters 22a, 22b and, further, supplied from the terminal T29 to the A/D converter 14 as a clock ADCK, so that the operation timing in each of the circuit portions is controlled in synchronization with the master clock MCK.

The output of the frequency divider 26 in the camera signal processing block 20 is supplied from the terminal T26 as the horizontal sync signal AHD to the on-screen display 15 and by way of a terminal T34 of the timing generation block 30 to the CCD driving timing generation circuit 31. Further, the output from the frequency divider 26 is supplied to the frequency divider 27 and further divided by the frequency divider 27 by a predetermined divisional ratio (for example, 1/262.5 in a case of NTSC system and 1/312.5 in a case of PAL system) and supplied from the terminal T27 as the vertical sync signal AVD to the on-screen display 15 and by way of the terminal T33 to the CCD driving timing generation circuit 31 of the timing generation block 30.

Therefore, the master clock MCK, the horizontal sync signal AHD and the vertical sync signal AVD in synchronization with the standard clock 4Fsc are supplied to the on-screen display 15 to enable display control upon camera recording.

As described above, during camera recording, the master clock MCK is locked in a state synchronized with the standard clock 4Fsc outputted from the crystal oscillator 23 by the PLL circuit constituted with the phase comparator 28 of the camera signal processing block 20 and the VCO 17, and the operation of the camera signal processing block 20, the timing generation block 30 and the on-screen display 15 is controlled by the master clock MCK.

Then, the explanation is to be made for the operation during VTR reproduction for displaying the VTR reproduced image signal reproduced by the VTR on a monitor device.

During VTR reproduction, the switch 12 and the switch 29 of the camera signal processing block 20 are controlled so as to be in contact with the contacts t2 respectively, and the switch 41 of the burst lock block 40 is controlled so as to be in contact with the contact t1.

In this case, the VTR reproduced image signal (composite signal) inputted from a terminal T42 of the burst lock block 40 is supplied by way of the switch 41 of the burst lock block 40, the AGC circuit 13 and the A/D converter 14 to the signal processing circuit 21 of the camera signal processing block 20, in which cross talks and noises in the VTR reproduced image signal are eliminated by the reproduction comb filter disposed in the signal processing circuit 21, and the video signal is separated into a luminance signal and a chroma signal. Then, they are put to D/A conversion by the D/A converters 22a, 22b, outputted from the terminals T22, T23 as the luminance signal Y1 and the chroma signal C1 respectively and then supplied to the display circuit block in the succeeding stage not illustrated.

As the clock generation processing during VTR reproduction, the standard clock 4Fsc is supplied to the terminal T21 of the camera signal processing block 20, and the standard clock 4Fsc is supplied by way of the switch 29 to the signal processing circuit 21 and the D/A converters 22a, 22b and, further, supplied as a clock ADCK by way of the terminal 29 to the A/D converter 14.

Further, the standard clock 4Fsc is supplied to the frequency divider 24, divided into 1/4 and then outputted as the sub-carrier signal Fsc from the terminal T25. The sub-carrier signal Fsc is supplied as a decoding signal for the chroma signal of the VTR to a not-illustrated VTR signal processing block.

The VTR reproduced image signal supplied to the burst lock block 40 is supplied by way of the switch 41 to the sync separation circuit 42, and the sync signal SYNC is separated in the sync separation circuit 42 and supplied by way of a terminal T46 to the horizontal/vertical sync separation circuit 61 of the external input PLL circuit block 60.

In the horizontal/vertical separation circuit 61, the sync signal SYNC is separated into a vertical sync signal V and a horizontal sync signal H, and the separated vertical sync signal VD and the horizontal sync signal HD are supplied to the on-screen display 15.

Further, the horizontal sync signal HD outputted from the horizontal/vertical separation circuit 61 is supplied to one of terminals of the phase comparator 62. Further, the output from the frequency divider 63 is supplied to the other terminal of the phase comparator 62.

The output from the phase comparator 62 is supplied by way of the LPF 65 to the VCO 64, and the output from the VCO 64 is supplied, as a clock CK, to the on-screen display 15 and also to the frequency divider 63. The clock is divided by the frequency divider 63 into 1/k and outputted to the phase comparator 62. This constitutes a PLL circuit for controlling the oscillation frequency of the VCO 64 and, in a locked state of the PLL circuit, the clock CK outputted from the VCO 64 is synchronized with the VTR reproduced image signal.

Thus, the on-screen display 15 is supplied with the clock CK, the horizontal sync signal HD and the vertical sync signal VD synchronized with the inputted VTR reproduced image signal, to thereby enable display control also during VTR reproduction.

As described above, during VTR reproduction, the camera signal processing block 20 is controlled by the standard clock 4Fsc from the crystal oscillator 23 and the external input PLL circuit block 60 generates the clock CK, the horizontal sync signal HD and the vertical sync signal VD synchronized with the VTR reproduced image signal, to . thereby enable display control by the on-screen display 15 also during VTR reproduction.

Then, explanation is to be made for the operation during line recording of recording the line input signal into the VTR.

Upon during line input, the switch 41 of the burst lock block 40 is controlled so as to be in contact with the contact t2.

In this case, the line input signal inputted from the terminal T41 of the burst lock block 40 is supplied to the line input comb filter block 50, separated by the line comb filter 51 into the luminance signal Y2 and the chroma signal C2, and supplied, for example, to a display circuit block and a VTR signal processing block in the succeeding stage not illustrated.

As the clock generation processing during line input, the line input signal supplied to the burst lock block 40 is supplied by way of the switch 41 to the sync separation circuit 42 and the color burst separation circuit 43.

In the sync separation circuit 42, the sync signal SYNC contained in the line input signal is separated and supplied to the horizontal/vertical sync separation circuit 61 of the external input PLL circuit block 60, and the same processing as described for the VTR reproduction is conducted, and the clock CT, the horizontal sync signal HD and the vertical sync signal VD are supplied in synchronization with the line input signal to the on-screen display 15. Thus, display control can be conducted in the on-screen display 15 also during line input.

On the other hand, in the color burst separation circuit 43 of the burst lock block 40, the color burst signal contained in the line input signal is separated and outputted to one terminal (−) of the phase comparator 44. Further, the output from the frequency divider 45 is supplied to the other terminal (+) of the phase comparator 44.

The output from the phase comparator 44 is inputted by way of a terminal T44 to the LPF 46 and then supplied through the LPF 46 to the VCO 47. The output from the VCO 47 is supplied to the frequency divider 45 divided by 1/4 and outputted to the phase comparator 44. Thus, the PLL circuit for controlling the oscillation frequency of the VCO 47 is constituted. In the locked state of the PLL circuit, the oscillation frequency 4Fsc' from the VCO 47 is synchronized with the sub-carrier Fsc' of the line input signal. The VCO 47 is constituted as a crystal VCO formed by the provision of a quartz oscillator.

Then, the oscillation frequency 4Fsc' of the VCO 47 is supplied to the line input comb filter block 50. The oscillation frequency of the VCO 47 (standard clock) 4Fsc' is supplied as a decoding signal upon recording the chroma signal in the line input signal in the VTR to a not-illustrated VTR signal processing block.

As described above, during line input, the sub-carrier 4Fsc' four times as high as the line input signal is formed by the PLL circuit constituted with the VCO 47 and the phase comparator 44 of the burst lock block 40, so that the operation timing of the line input form filter block 50 is controlled, as well as the clock CK, the horizontal sync signal HD and the vertical sync signal VD synchronized with the line input signal are generated by the external input PLL circuit block 60, to thereby enable display control by the on-screen display 15 also during line input.

By the way, the signal processing circuit 100 provided in the camcorder of the prior art requires the external input PLL circuit block 60 for generating the line input signal and the clock CK, the horizontal sync signal HD and the vertical sync signal VD synchronized with the VTR reproduced image signal to the on-screen display 15 in order to display character information and the like on the monitor such as a view finder also during line input or VTR reproduction, to complicate the circuit structure.

Further, since the sub-carrier frequency is different between the camera recording and VTR reproduction, and the line input, it is necessary to provide a standard clock for generating the sub-carrier Fsc during camera recording and VTR reproduction (crystal oscillator 23) and a standard clock for generating the sub-carrier Fsc' during line input (VCO 47), respectively.

Furthermore, since the standard clock is different between the camera recording and the VTR reproduction, and the line input as described above, a line comb filter corresponding to the line input signal can not be constituted by utilizing the signal processing circuit 21 of the camera signal processing block 20, to which the standard clock in synchronization with the VTR reproduced video signal is supplied and it is necessary to additionally constitute the line input comb filter block 50.

SUMMARY OF THE INVENTION

In view of the above, the present invention has been accomplished in order to solve such problems and it is an object of the invention to simplify the structure of a signal processing circuit applied to a camcorder.

The foregoing object can be attained by a signal processing circuit provided in a camcorder having an image pick-up means for outputting a picked-up image as a picked-up video signal and a video tape recorder capable of recording/reproducing the video signal, and a line input means for inputting a video signal supplied from an outside, comprising:

a signal processing means which can conduct signal processing of separating the inputted video signal into at least a luminance signal component and a chroma signal component, on-screen display means capable of superimposing a required image signal on a video signal outputted from the signal processing means, a standard frequency oscillation means capable of generating a standard oscillation frequency based on a sub-carrier frequency Fsc by inputting a voltage of a predetermined fixed value to a quartz oscillation type voltage controlled oscillation means formed by the provision of a quartz oscillator, a horizontal sync signal extraction means capable of selectively inputting one of a reproduced video signal reproduced by the video tape recorder and a line input video signal inputted by the line input means and extracting and outputting a horizontal sync signal from the inputted video signal, a first phase locked loop circuit operating by the input of one of the frequency signal based on the standard oscillation frequency and the horizontal sync signal extracted by the horizontal sync signal extraction means as the input signal, a second phase locked loop circuit operating by the input of the sub-carrier frequency extracted from the line input signal as the input signal and by utilizing the quartz oscillation type voltage controlled oscillation means, and an operation control means which conducts operation of:
supplying a frequency signal obtained based on the output of a first clock generation means operating by the input of the frequency signal based on the standard oscillation frequency, as an operation clock, to the signal processing means, the on-screen display means and an optoelectronic conversion means forming the image pick-up means, when the image picked-up video signal is inputted to the signal processing means, supplying a frequency signal based on the standard oscillation frequency, as an operation clock, to the signal processing means and supplying a frequency signal obtained based on the output of the first clock generation means operating by the input of the horizontal sync signal of the reproduced video signal extracted by the horizontal sync signal extraction means, as an operation clock, to the on-screen display means, when the reproduced video signal is inputted to the signal processing means and supplying a frequency signal obtained based on the output of the second phase locked loop circuit, as an operation clock, to the signal processing means and supplying the frequency signal obtained based on the output of the first clock generation means operating by the input of the horizontal sync signals of the line input video signal extracted by the horizontal sync signal extraction means, as an operation clock, to the on-screen display means when the line input video signal is inputted to the signal processing means.

Further, according to the present invention, the signal processing circuit provided in a camcorder having an image pick-up means for outputting a picked-up image as a picked-up video signal and a video tape recorder capable of recording/reproducing the video signal, comprises:

a signal processing means which can conduct signal processing of separating the inputted video signal into at least a luminance signal component and a chroma signal component, an on-screen display means capable of superimposing a required image signal on a video signal outputted from the signal processing means, a standard frequency oscillation means capable of generating a standard oscillation frequency based on a sub-carrier frequency Fsc, a horizontal sync signal extraction means capable of extracting and outputting a horizontal sync signal from the reproduced video signal reproduced by the video tape recorder, a first phase locked loop circuit operating by the input of one of the frequency signal based on the standard oscillation frequency and the horizontal sync signal extracted by the horizontal sync signal extraction means as the input signal, and an operation control means which conducts operation of:
supplying a frequency signal obtained based on the output of a first clock generation means operating by the input of the frequency signal based on the standard oscillation frequency, as an operation clock, to the signal processing means, the on-screen display means and an optoelectronic conversion means forming the image pick-up means, when the image picked-up video signal is inputted to the signal processing means, supplying a frequency signal based on the standard oscillation frequency, as an operation clock, to the signal processing means and supplying a frequency signal obtained based on the output of the first clock generation means operating by the input of the horizontal sync signal of the reproduced video signal extracted by the horizontal sync signal extraction means, as an operation clock, to the on-screen display means, when the reproduced video signal is inputted to the signal processing means.

According to the present invention, since the frequency signal obtained based on the output from the first clock generation means operating by input of the frequency signal based on the standard oscillation frequency is supplied to the on-screen display means when the pick-up video signal is inputted to the signal processing means, the frequency signal obtained based on the output of the first clock generation means operating by input of the horizontal sync signal of the reproduced video signal extracted from the horizontal sync signal extraction means is supplied to the on-screen display means when the reproduced video signal is inputted, and the frequency signal obtained based on the output from the first clock generation means operating by input of the horizontal sync signal of the line input video signal extracted by the horizontal sync signal extraction means is supplied to the on-screen display means when the input image signal is inputted, the on-screen display means can be controlled also in a case of inputting the picked-up video signal, the reproduced video signal and the line input video signal.

Further, since the frequency signal based on the standard oscillation frequency is supplied, as the operation clock, to the signal processing means when the reproduced video signal is inputted to the signal processing means, and the frequency signal obtained based on the output from the second phase locked loop circuit is supplied, as the operation clock, to the signal processing means when the line input video signal is inputted, the reproduced video signal and the line input video signal can be separated into the luminance signal component and the chroma signal component by the signal processing means.

DESCRIPTION OF THE PREFERRED EMBODIMENT OF THE INVENTION

Preferred embodiments of the present invention will be explained below.

Figure 1:
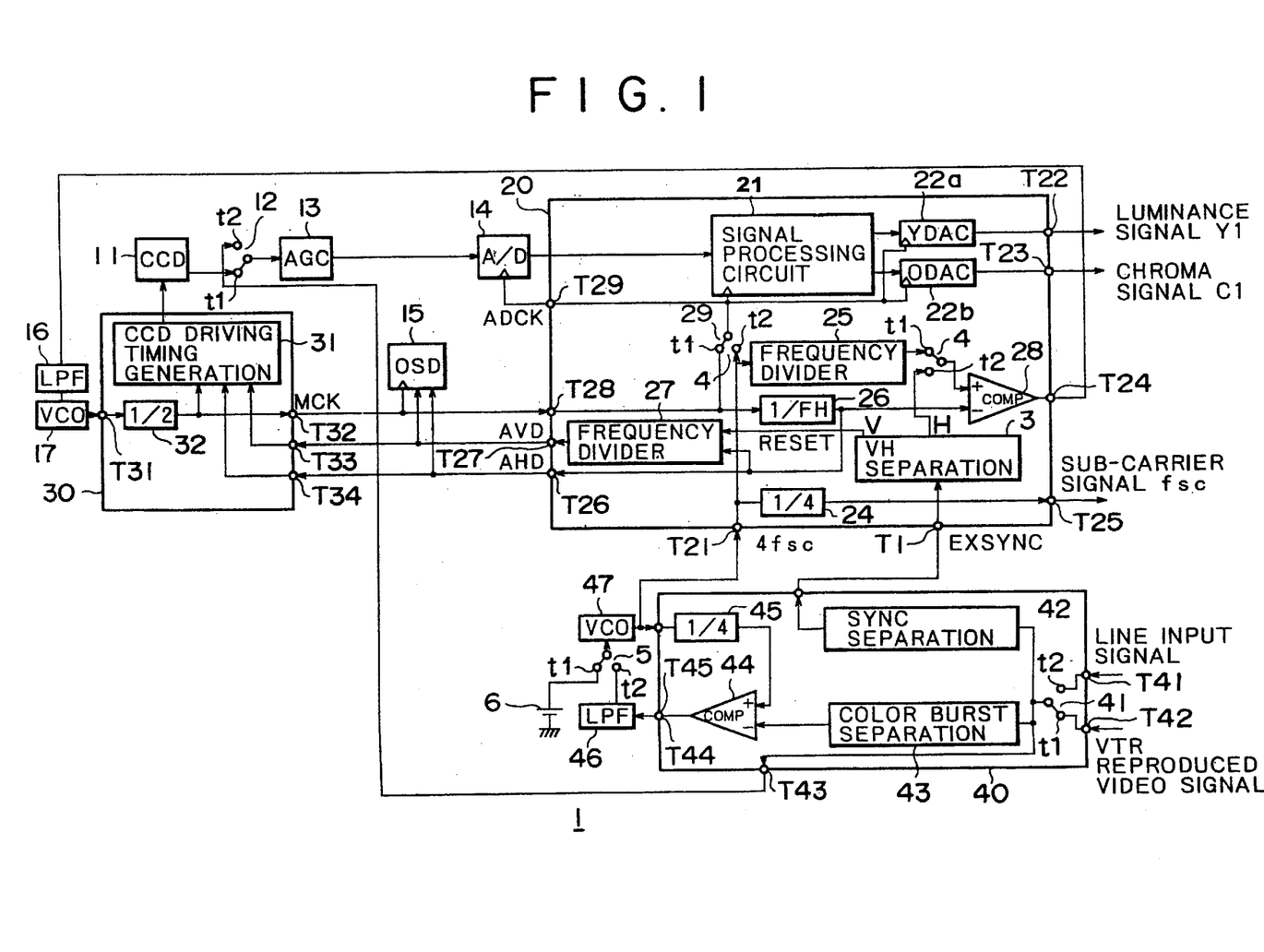
FIG. 1 is a block diagram of a signal processing circuit as a preferred embodiment of the present invention.

FIG. 1 illustrates an example of a block diagram for a signal processing circuit as a preferred embodiment of the present invention suitable to a camcorder.

Circuits identical with those in the signal processing circuit shown in FIG. 4 carry the same reference numerals for which duplicate explanation will be omitted.

In a signal processing circuit 1 as a preferred embodiment of the present invention shown in FIG. 1, a signal processing circuit 21 of a camera signal processing block 20 has various kinds of for applying predetermined processing when an image signal is supplied from a CCD 11 and also has a reproduction comb filter for eliminating crosstalk and noise when the VTR reproduced image signal is supplied as an external input signal and a line comb filter for eliminating cross talks and noises when a line input signal is supplied.

Further, a camera signal processing block 20 comprises a terminal T1 to which an external sync signal EXSYNC as a sync signal of an external input signal is outputted from a burst lock block 40 to a vertical/horizontal sync separation circuit 3 for separating a vertical sync signal V and a horizontal sync signal H from the external sync signal EXSYNC supplied by way of the terminal T1.

Further, a phase comparator 28 has, at one terminal (+) thereof, a switch 4 capable of switching to the output of a frequency divider 25 or to the output of the vertical/horizontal sync separation circuit 3.

A switch 5 is disposed in a connection line between an LPF 46 connected with a phase comparator 44 of the burst lock block 40 and a VCO 47, and the switch 5 can switch the oscillation frequency of the VCO 47 between a four times sub-carrier signal 4Fsc required during camera recording and VTR recording and a sub-carrier signal 4Fsc' four times of the line input signal required during line input as described later.

A voltage source 6 outputs a predetermined voltage for making the oscillation frequency of the VCO 47 to the sub-carrier signal 4Fsc four times of the image signal picked-up by the CCD 11 or the VTR reproduced video signal.

The operation of the signal processing circuit 100 described above will be explained.

At first, explanation is to be made for the operation during camera recording for recording the image signal picked-up by the CCD 11 in the VTR.

Upon camera recording, the switch 5, the switch 12 and the switch 4 and the switch 29 of the camera signal processing block 20 are controlled so as to be in contact with contact t1 and t2.

In this case, the image signal picked-up by the CCD 11 is supplied by way of the switch 12, the AGC circuit 13, and the A/D converter 14 to the signal processing circuit 21 of the camera signal processing block 20 and applied with a predetermined processing by the signal processing circuit 21. Then, they are put to D/A conversion by the D/A converters 22a, 22b and outputted as a luminance signal Y1 and a chromatic signal C1 from terminals T22, T23 respectively and are supplied, for example, to a display circuit block or a VTR signal processing block in the succeeding stage.

As the clock forming processing during camera recording, a clock 4Fsc four times as high as a sub-carrier signal Fsc (14.3 MHz where the television system is NTSC system, or at 17.3 MHz when the television system is PAL system), and the clock 4Fsc is used as a standard clock for operating the camcorder. The VCO 47 is constituted as a crystal VCO by the provision of a quartz oscillator.

The standard clock 4Fsc is supplied to the frequency divider 24 and the frequency divider 25.

The frequency divider 24 divides the standard clock 4Fsc into 1/4, which is supplied from a terminal T25 as a sub-carrier signal Fsc. The sub-carrier signal Fsc is supplied to a not-illustrated VTR signal processing block as a decoding signal upon recording the image picked-up by the CCD 11 in VTR.

The frequency divider 25 divides the standard clock 4Fsc by a predetermined dividing ratio (for example 1/910 in a case of NTSC system and 1/1135 in a case of PAL system). and outputs the same, for example, as a horizontal sync signal to one terminal (+) of the phase comparator 28.

An output from the frequency divider 26 is supplied to the other terminal (−) of the phase comparator 28, and the phase comparator 28 outputs a result of phase comparison between the output from the frequency divider 25 and the output from the frequency divider 26.

The output from the phase comparator 28 is supplied by way of a terminal T24 to the LPF 16 and supplied by way of the LPF 16 to the VCO 17. Therefore, the oscillation frequency of the VCO 17 is controlled by the output of the phase comparator 28. The output from the VCO 17 is supplied by way of the terminal T31 to the frequency divider 32 of the timing generation block 30. The frequency divider 32 divides the output from the VCO 17 into 1/2, and the divided output is supplied as a master clock MCK from the terminal T32 by way of the terminal T28 of the camera signal processing block 20 to the frequency divider 26. The frequency divider 26 divides the master clock MCK by a divisional ratio 1/FH and outputs the same to the phase comparator 28. The dividing ratio 1/FH of the frequency divider 26 is determined by the number of pixels of the CCD 11.

They constitute a first PLL circuit for controlling the oscillation frequency of the VCO 17, and in a state in which the first PLL circuit is locked, the master clock MCK is synchronized with the standard clock 4Fsc.

The master clock MCK is supplied to the CCD driving timing generation circuit 31 of the timing generation block 30, the on-screen display 15 and by way of the switch 29 of the camera signal processing block 20 to the signal processing circuit 21 and the D/A converters 22a, 22b and, further, supplied from the terminal T29 to the A/D converter 14 as a clock ADCK, by which the operation timing in each of the circuit portions is controlled in synchronization with the master clock MCK.

The output of the frequency divider 26 in the camera signal processing block 20 is supplied from the terminal T26 as the horizontal sync signal AHD to the on-screen display 15 and by way of the terminal T34 of the timing generation block 30 to the CCD driving timing generation circuit 31. Further, the output from the frequency divider 26 is supplied to the frequency divider 27 and further divided by the frequency divider 27 by a predetermined divisional ratio (for example, 1/262.5 in a case of NTSC system and 1/312.5 in a case of PAL system) and supplied from the terminal T27 as the vertical sync signal AVD to the on-screen display 15 and by way of the terminal T33 to the CCD driving timing generation circuit 31 of the timing generation block 30.

Therefore, the master clock MCK, the horizontal sync signal AHD and the vertical sync signal AVD in synchronization with the standard clock 4Fsc are supplied to the on-screen display 15, to thereby enable display control upon camera recording.

As described above, during camera recording, the master clock MCK is locked in a state synchronized with the standard clock 4Fsc outputted from the VCO 47 by the PLL circuit constituted with the phase comparator 28 of the camera signal processing block 20 and the VCO 17, and the operation of the camera signal processing block 20, the timing generation block 30 and the on-screen display 15 is controlled by the master clock MCK.

Then, the explanation is to be made for the operation during VTR reproduction for displaying the VTR reproduced image signal reproduced by the VTR on a monitor device.

During VTR reproduction, the switch 12 and the switch 5 and the switch 29 of the camera signal processing block 20 are controlled so as to be in contact with the contacts t2 respectively. In this case, the VTR reproduced image signal (composite signal) inputted from the terminal T42 of the burst lock block 40 is supplied by way of the switch 41 of the burst lock block 40, the terminal T43, the switch 12, the AGC circuit 13.and the A/D converter 14 to the signal processing circuit 21 of the camera signal processing block 20, in which crosstalk and noise in the VTR reproduced image signal are eliminated by the reproduction comb filter disposed in the signal processing circuit 21, and the video signal is separated into a luminance signal and a chroma signal. Then, they are put to D/A conversion by the D/A converters 22*a*, 22*b*, outputted from the terminals T22, T23 as the luminance signal Y1 and the chroma signal C1 respectively and then supplied, for example, to the display circuit block in the succeeding stage not illustrated.

As the clock generation processing during VTR reproduction, the standard clock 4Fsc outputted from the VCO 47 is supplied by way of the terminal T21 of the camera signal processing block 20, and the standard clock 4Fsc is supplied by way of the switch 29 to the signal processing circuit 21 and the D/A converters 22*a*, 22*b* and, further, supplied by way of the terminal 29 to the A/D converter 14 as the clock ADCK.

Further, the standard clock 4Fsc is supplied to the frequency divider 24, divided into 1/4 and then outputted from the terminal T25 as the sub-carrier signal Fsc. The sub-carrier signal Fsc is supplied as a decoding signal for the chroma signal of the VTR to a not-illustrated VTR signal processing block.

The VTR reproduced image signal supplied to the burst lock block 40 is supplied by way of the switch 41 to the sync separation circuit 42, and the sync signal is separated in the sync separation circuit 42 and supplied by way of a terminal T1 of the camera signal processing circuit 20 to the horizontal/vertical sync separation circuit 3.

In the horizontal/vertical separation circuit 3, the external sync signal EXSYNC is separated into the vertical sync signal V and the horizontal sync signal H, and the separated vertical sync signal V is supplied as a reset signal to the frequency divider 27, while the horizontal sync signal H is supplied by way of the switch 4 to one terminal (+) of the phase comparator 28. The output from the frequency divider 26 is supplied to the other terminal (−). The phase comparator 28 outputs a result of the phase comparison between the horizontal sync signal H outputted from the horizontal/vertical separation circuit 3 and the output from the frequency divider 26.

The output from the phase comparator 28 is supplied by way of the terminal T24 to the LPF 16 and then supplied through the LPF 16 to the VCO 17. Accordingly, the oscillation frequency of the VCO 17 is controlled by the output from the phase comparator 28. The output of the VCO 17 is supplied by way of the terminal T31 to the frequency divider 32 of the timing generation block 30 by way of the terminal T31. Then, the output from the VCO 17 divided into 1/2 by the frequency divider 32 is supplied as the master clock MCK to the frequency divider 26 of the camera signal processing block 20 by way of the terminal T28, divided into 1/FH by the frequency divider 26 and outputted to the phase incomparator 28.

This constitutes a first PLL circuit for controlling the oscillation frequency of the VCO 17 and, in a locked state of the first PLL circuit, the master clock MCK synchronized with the VTR reproduced image signal is supplied to the on-screen display 15.

The output from the frequency divider 26 of the camera signal processing block 20 is supplied as the horizontal sync signal AHD to the on-screen display 15, also supplied to the frequency divider 27, further divided and supplied as the vertical sync signal AVD to the on-screen display 15.

Thus, the on-screen display 15 is supplied with the clock MCK, the horizontal sync signal AHD and the vertical sync signal AVD synchronized with the VTR reproduced video signal, to thereby enable display control also during VTR reproduction.

As described above, during VTR reproduction, the camera signal processing block 20 is controlled by the standard clock 4Fsc outputted from the VCO 47, and the master clock MCK synchronized with the VTR reproduced video signal is formed by the first PLL circuit constituted with the VCO 17 and the phase comparator 28, and the horizontal sync signal AHD and the vertical sync signal AVD are formed from the master clock MCK, to thereby enable display by the on-screen display 15 also during VTR reproduction.

Then, description is to be made for the operation during line input for recording the line input signal into the VTR.

During line input, the switch 5, the switch 12, the switch 4 and the switch 29 of the camera signal processing block 20, and the switch 41 of the burst lock block 40 are controlled so as to be in contact with the contacts t2.

In this case, the line input signal inputted from the terminal T41 of the burst lock block 40 is supplied by way of the switch 41 and the terminal T43 of the color burst lock block 40 and through the switch 12, the AGC circuit 13 and the A/D converter 14 to the signal processing circuit 21 of the camera signal processing block 20 and separated into a luminance signal and a chroma signal by the line comb filter provided in the signal processing circuit 21. Then, they are put to D/A conversion by the D/A converters 22*a*, 22*b*, outputted from the terminals T22, T23 as the luminance signal Y1 and the chroma signal C1 and supplied, for example, to a display circuit block and a VTR signal processing block in the subsequent stage.

As the clock generation processing during line input, the line input signal supplied to the burst lock block 40 is supplied by way of the switch 41 to the sync separation circuit 42 and the color burst separation circuit 43. In the color burst separation circuit 43, the color burst signal contained in the line input signal is separated and supplied to one terminal (−) of the phase comparator 44. Further, the output from the frequency divider 45 is supplied to the other terminal (+) of the phase comparator 44.

The output from the phase comparator 44 is supplied by way of the LPF 46 and the switch 5 to the VCO 47, the output VCO 47 is supplied to the phase comparator 45, divided into 1/4 and outputted to the phase comparator 44. Thus, the second PLL circuit for controlling the oscillation frequency of the VCO 47 is constituted and, in the locked state of the second PLL circuit, the oscillation frequency 4Fsc' of the VCO 47 is synchronized with the sub-carrier 4Fsc' of the line input signal.

The oscillation frequency 4Fsc' of the VCO 47 is supplied as a standard clock by way of the terminal T21 of the camera signal processing block 20 to the signal processing circuit 1. Thus, in the signal processing circuit 2, the line comb filter can be constituted based on the standard clock 4Fsc'.

Further, the oscillation frequency 4Fsc' of the VCO 47 is supplied to the frequency divider 24, divided into 1/4 and outputted as the sub-carrier signal Fsc' from the terminal T25. The sub-carrier signal Fsc' is supplied as a decoding signal upon recording the color signal of the line input signal in the VTR to a VTR signal processing block not illustrated.

In the sync separation circuit portion 42 of the burst lock block 40, the sync signal contained in the line input signal is separated, supplied as the external sync signal EXSYNC from the input terminal T1 of the camera signal processing block 20 to the horizontal/vertical sync separation circuit 3, in which the master clock MCK, the horizontal sync signal AHD and the vertical sync signal AVD synchronized with the line input signal to control the operation of the on-screen display 15 in the same manner as the VTR reproduction. This enables to control display also during external input.

As described above, since the oscillation frequency 4Fsc' four times as high as the sub-carrier of the line input signal is formed by the second PLL circuit constituted with the VCO 47 of the burst lock block 40 and the phase comparator 44 and it is supplied, as a standard clock, to the signal processing circuit 2 of the camera signal processing block 20, the line comb filter can be constituted with the signal processing circuit 2.

Further, since the master clock MCK synchronized with the line input signal is generated by the first PLL circuit comprising the VCO 17 and the phase comparator 28, and the vertical sync signal AVD and the horizontal sync signal AHD are generated from the master clock MCK and supplied to the on-screen display 15, it is possible to control display also during line input.

Then, description is to be made to the signal processing circuit 2 provided to the camera signal processing block 20 described above.

Figure 2:
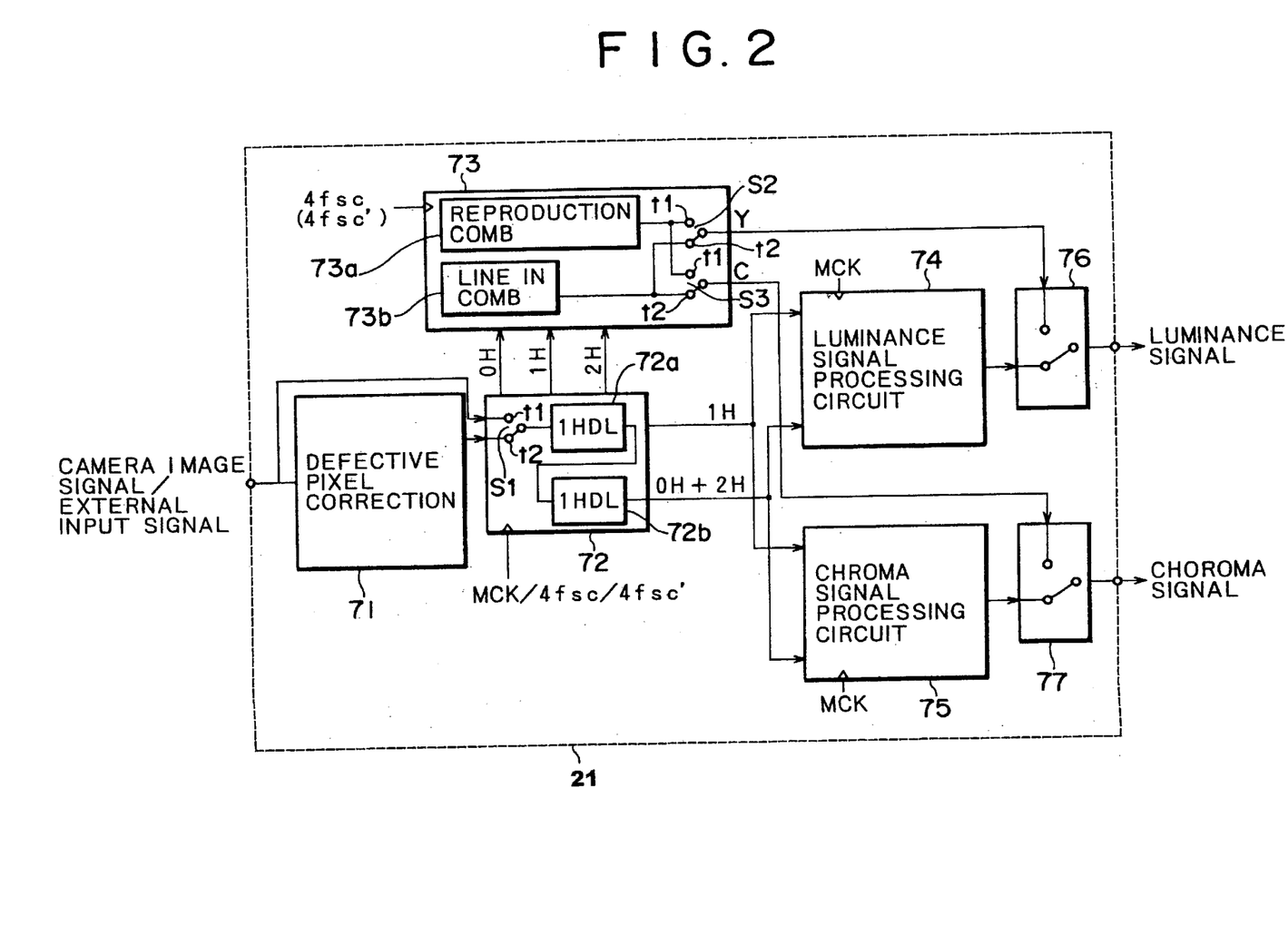
FIG. 2 is a block diagram illustrating the constitution of the signal processing circuit provided in a camera signal processing block of the signal processing circuit as a preferred embodiment of the present invention.

FIG. 2 shows a block diagram for the signal processing circuit 2, and a defective pixel correction portion 71 shown in the figure is adapted to detect and correct a defective pixel when an image signal of the CCD 11 is supplied from the A/D converter 14 in the preceding stage during camera recording.

The delay line 72 is provided with a switch S1, H1 delay lines (1HDL) 72a, 72a and control such that the switch S1 is in contact with a terminal t2 during camera recording, and an image signal is supplied from the defective pixel correction portion 71.

Further, during camera recording, since the standard clock MCK is supplied to the signal processing circuit 21, the delay line 72 supplies a signal (1H) formed by delaying an image signal by 1H based on the standard clock MCK, and a signal (0H+2H) formed by adding the input signal (0H) and an image signal delayed by 2H (2H) to a luminance signal processing circuit 74 and a chroma signal processing circuit 75, respectively.

The luminance signal processing circuit 74 applies, based on the clock MCK, various signal processing's such as clipping or γ-correction to the image signals supplied from the delay line 72 and outputting them by way of a switch 76 as the luminance signal.

Further, the chroma signal processing circuit 75 also applies, based on the standard clock MCK, various signal processing's such as clipping or γ-correction to the image signals supplied from the delay line 72 and output them as the chroma signal.

Then, when the VTR reproduced video signal is supplied from the A/D converter 14 during VTR reproduction, the switch S1 of the delay line 72 is controlled so as to be in contact with the terminal t1 and the VTR reproduced video signal is supplied to the delay lines 72a, 72a.

Further, since the standard clock 4Fsc is supplied to the signal processing circuit 2 during VrR reproduction, the delay line 72 supplies the inputted VTR reproduced video signal (0H), the signal (1H) delayed by 1H and the signal (2H) delayed by 2H for the VTR reproduced video signal based on the standard clock 4Fsc to the comb filter 73.

The comb filter 73 comprises a reproduction comb filter 73a, a line comb filter 73b and switches S2, S3. During VTR reproduction, the standard clock 4Fsc is supplied, the switches S2, S3 are controlled so as to be in contact with terminals t1 and functions as the reproduction filter 73a based on the standard clock 4Fsc. Accordingly, the reproduced video signal supplied from the delay line 72 is separated by the reproduction comb filter 73a into the luminance signal Y and the chroma signal C and outputted by way of the switches 76, 77.

Further, when the line input signal is supplied from the A/D converter 14 in the succeeding stage during line input, the switch S1 of the delay line 72 is controlled so as to be in contact with the terminal t1, and the line input signal is supplied to the delay lines 72a, 72a.

Further, since the standard clock 4Fsc' is supplied to the signal processing circuit 21 during line input, the delay line 72 supplies an inputted line input signal (0H), a signal (1H) formed by delaying the line input signal by 1H and a signal (2H) formed by delaying by 2H based on the standard clock 4Fsc' to the comb filter 73.

In this case, the comb filter 73 is supplied with the standard clock 4Fsc', and the switches S2, S3 are controlled so as to be in contact with the terminals t2 respectively, and it functions as the line comb filter 73b. Therefore, line input signal supplied from the delay line 72 is separated into the luminance signal Y and the chroma signal C by the line comb filter 72b and outputted by way of the switches 76, 77.

Since the reproduction comb filter 73a and the line comb filter 73b provided in the comb filter 73 have substantially identical constitution, they can be constituted by using main circuit block in common.

As described above, in the signal processing circuit 21 as the preferred embodiment according to the present invention, since the standard clock 4Fsc synchronized with the VTR reproduced image signal is inputted during VTR reproduction, the standard clock 4Fsc' synchronized with the line input signal is inputted during line input, the reproduction comb filter 73a or the line comb filter 73b can be constituted with the supplied standard clock.

Figure 3:
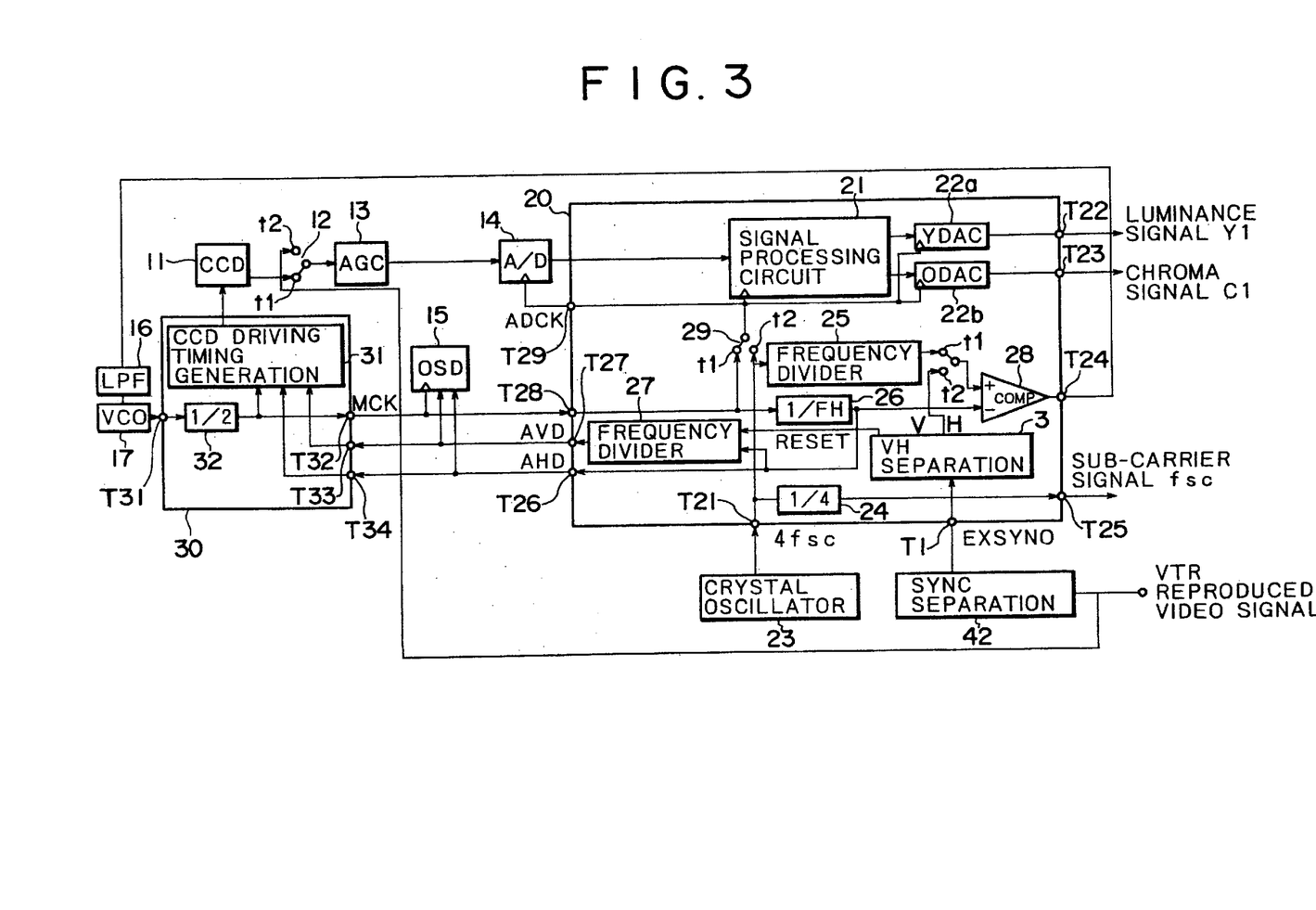
FIG. 3 is a block diagram of a signal processing circuit for another embodiment of the present invention.

FIG. 3 shows an example of a block diagram of a signal processing circuit in which a line input function for recording the line input signal in the VTR is not provided as another embodiment of the present invention.

Identical circuits with the signal processing circuit 1 shown in FIG. 1 carry the same reference numerals, for which duplicated explanation will be omitted.

As shown in the figure, in a case of not providing the line input function, since it is not necessary for constituting the line comb filter to the signal processing circuit 21 of the camera signal processing block 20, it may suffice to connect a crystal oscillator 23 for generating the standard clock 4Fsc during camera recording and VTR reproduction to the terminal T21. Further, it may suffice to connect the sync separation circuit 42 for sync separation of the VTR reproduced video signal to the terminal T1 to which the external sync signal is inputted, by which the operation timing of the on-screen display 15 can be controlled by a more simple constitution.

As has been described above according to the signal processing circuit of the present invention, the circuit structure can be simplified significantly and the on-screen display can be controlled also in a case of inputting the image picked up video signal, the reproduced video signal and the line input video signal to the signal processing means in the same manner as usual.

Further, since the frequency signal based on the standard oscillation frequency is supplied, as the operation clock, to the signal processing means when the reproduced video signal is inputted to the signal processing means, and the frequency signal obtained based on the output of the second phase locked loop circuit, as the operation clock, to the signal processing means when the line input image signal is inputted, the reproduced video signal and the line input video signal can be separated into the luminance signal component and chroma signal component by the signal processing means.

What is claimed is:

1. A signal processing circuit provided in a camcorder having an image pick-up means for outputting a video signal and a video tape recorder capable of recording/reproducing the video signal, and a line input means for inputting a video signal supplied from an external source, comprising:

signal processing means for separating the inputted video signal into at least a luminance signal component and chroma signal component, on-screen display means for superimposing an image signal on a video signal outputted from the signal processing means, frequency oscillation means capable of generating a standard oscillation frequency based on a sub-carrier frequency $f_{sc}$ inputting a voltage of a predetermined fixed value to a voltage controlled oscillation means, horizontal sync signal extraction means for selectively inputting one of a video signal from the video tape recorder and the line input video signal, and extracting and outputting a horizontal sync signal from the inputted video signal, a first phase locked loop circuit operating by the input of one of the frequency signal based on the standard oscillation frequency and the horizontal sync signal extracted by the horizontal sync signal extraction means as the input signal, a second phase locked loop circuit operating by the input of the sub-carrier frequency extracted from the external line input signal and the voltage controlled oscillation means, and operation control means for:

supplying a frequency signal obtained based on the output of a first clock generation means based on the standard oscillation frequency as an operation clock for the signal processing means, wherein the on-screen display means and an optoelectronic conversion means form the image pick-up means, supplying a frequency signal based on the standard oscillation frequency as an operation clock for the signal processing means, supplying a frequency signal obtained based on the output of the first clock generation means operating by the input of the extracted horizontal sync signal as an operation clock for the on-screen display means, supplying a frequency signal based on the output of the second phase locked loop circuit as an operation clock for the signal processing means, and supplying a frequency signal based on the output of the first clock generation means operating by the input of the horizontal sync signals of the line input video signal extracted by the horizontal sync signal extraction means as an operation clock for the on-screen display means.

2. A signal processing circuit provided in a camcorder having an image pick-up means for outputting a video signal and a video tape recorder capable of recording/reproducing the video signal, and a line input means for inputting a video signal, the signal processing circuit comprising:

signal processing means for separating the inputted video signal into at least a luminance signal component and chroma signal component, on-screen display means capable of superimposing an image signal on a video signal outputted from the signal processing means, frequency oscillation means capable of generating a standard oscillation frequency based on a sub-carrier frequency $f_{sc}$, horizontal sync signal extraction means capable of extracting and outputting a horizontal sync signal from the inputted video signal, a first phase locked loop circuit operating based on the standard oscillation frequency and the extracted horizontal sync signal as the input signal, operation control means for:

supplying a frequency signal based on the output of a first clock generation means operating by the standard oscillation frequency as an operation clock for the signal processing means, where the on-screen display means and an optoelectronic conversion means form the image pick-up means, supplying a frequency signal based on the standard oscillation frequency as an operation clock for the signal processing means and supplying a frequency signal obtained based on the output of the first clock generation means operating by the input of the horizontal sync signal of the reproduced video signal extracted by the horizontal sync signal extraction means as an operation clock for the on-screen display means.

3. A camcorder having an image pickup-means for outputting a video signal, a video tape recorder capable of recording/reproducing the video signal, a signal processing circuit and a line input means for inputting a video signal supplied from an external source, wherein the signal processing circuit comprises:

signal processing means for separating the inputted video signal into at least a luminance signal component and a chroma signal component, on-screen display means capable of superimposing an image signal on a video signal outputted from the signal processing means, frequency oscillation means for generating a standard oscillation frequency based on a sub-carrier frequency $f_{sc}$ by inputting a predetermined fixed voltage to a voltage controlled oscillation means, horizontal sync signal extraction means for selectively inputting one of a signal reproduced by the video tape recorder and a line input video signal inputted by the line input means and extracting and outputting a horizontal sync signal from the inputted video signal, a first phase locked loop circuit operating from one of the frequency signal based on the standard oscillation frequency and the horizontal sync signal extracted by the horizontal sync signal extraction means as the input signal, a second phase locked loop circuit operating from the sub-carrier frequency extracted from the line input signal as the input signal and the voltage controlled oscillation means, and operation control means for:

supplying a frequency signal from the output of a first clock generation means operating from the frequency signal based on the standard oscillation frequency as an operation clock for the signal processing means, wherein the on-screen display means and an optoelectronic conversion means form the image pick-up means, supplying a frequency signal based on the standard oscillation frequency as an operation clock for the signal processing means, supplying a frequency signal obtained based on the output of the first clock generation means operating by the input of the horizontal sync signal of the reproduced video signal extracted by the horizontal sync signal extraction means as an operation clock for the on-screen display means, and supplying a frequency signal obtained based on the output of the second phase locked loop circuit as an operation clock for the signal processing means and supplying the frequency signal obtained based on the output of the first clock generation means operating from the extracted horizontal sync signal as an operation clock for the on-screen display means.

4. A camcorder having an image pick-up means for outputting a video signal, a video tape recorder capable of recording/reproducing the video signal, and a signal processing circuit, the signal processing circuit comprising:

signal processing means for separating a video signal into at least a luminance signal component and a chroma signal component, on-screen display means for superimposing an image signal on a video signal outputted from the signal processing means, frequency oscillation means for generating a standard oscillation frequency based on a sub-carrier frequency $f_{sc}$, horizontal sync signal extraction means for extracting and outputting a horizontal sync signal from the video signal reproduced by the video tape recorder, a first phase locked loop circuit operating from one of the frequency signal based on the standard oscillation frequency and the horizontal sync signal extracted by the horizontal sync signal extraction means as the input signal, and operation control means for:

supplying a frequency signal from the output of a first clock generation means operating from the frequency signal based on the standard oscillation frequency as an operation clock for the signal processing means, wherein the on-screen display means and an optoelectronic conversion means form the image pick-up means, and supplying a frequency signal based on the standard oscillation frequency as an operation clock for the signal processing means and supplying a frequency signal from the output of the first clock generation means operating from the extracted horizontal sync signal of the reproduced video signal.

5. The signal processing circuit of claims 1, 2, 3, or 4, wherein the voltage-controlled oscillator is a quartz crystal voltage-controlled oscillator.

6. The signal processing circuit of claims 1, 2, 3, or 4, wherein said separation of the video signal into luminance signal and chroma signal components is performed by line comb filters contained within said signal processing circuit.

7. The signal processing circuit of claim 6, wherein said line comb filters are based on said standard oscillation frequency.

8. The signal processing circuit of claims 1, 2, 3, or 4, wherein a master clock, a horizontal sync signal, a vertical sync signal are all supplied to said on-screen display and are all synchronized with said standard oscillation frequency.

9. The signal processing circuit of claims 1, 2, 3, or 4, wherein said standard oscillation frequency is compatible with either NTSC or PAL configurations.

* * * * *